US012766547B2

(12) United States Patent
Mok

(10) Patent No.: US 12,766,547 B2
(45) Date of Patent: Oct. 20, 2026

(54) MOTOR OPERATED DISPENSING DEVICE WITH CUTTING BLADE

(71) Applicant: TECHTRONIC CORDLESS GP, Anderson, SC (US)

(72) Inventor: Kwok Ting Mok, Hong Kong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 76 days.

(21) Appl. No.: 18/802,832

(22) Filed: Aug. 13, 2024

(65) Prior Publication Data

US 2025/0058348 A1 Feb. 20, 2025

(30) Foreign Application Priority Data

Aug. 18, 2023 (HK) .......................... 22023077786.8

(51) Int. Cl.
*B05C 17/01* (2006.01)

(52) U.S. Cl.
CPC ...... *B05C 17/0103* (2013.01); *B05C 17/0106* (2013.01)

(58) Field of Classification Search
None
See application file for complete search history.

(56) References Cited

U.S. PATENT DOCUMENTS 4,615,469 A * 10/1986 Kishi .................. B05C 17/0103 222/327
4,669,636 A * 6/1987 Miyata ................ B05C 17/0103 222/391
5,503,307 A * 4/1996 Wilson ................ B05C 17/0106 222/326
9,205,451 B2 * 12/2015 Zahr .................. B05C 17/0106
2002/0108971 A1 8/2002 Lafond
2008/0006654 A1 * 1/2008 Lampe ................ B05C 17/0106 222/386

(Continued)

FOREIGN PATENT DOCUMENTS

JP S63185475 A 8/1988

OTHER PUBLICATIONS

Extended European Search Report for Application No. 24194354.7 dated Feb. 3, 2025 (11 pages).

*Primary Examiner* — Paul R Durand
*Assistant Examiner* — Michael J. Melaragno
(74) *Attorney, Agent, or Firm* — Michael Best & Friedrich LLP

(57) ABSTRACT

A dispensing device for dispensing a viscous material from a cartridge received in the device includes a main housing, a front support, a rear plunger assembly, a motor, and gear assembly. The rear plunger assembly is spaced apart from the front support by an elongate member. The rear plunger assembly includes a plunger plate supported in a plunger housing above a cutting edge. The rear plunger assembly is rotatable about an axis parallel to the longitudinal axis of the elongate member. The motor and gear assembly are disposed in the housing and are engageable with the elongate member to move one of the front support and the rear plunger assembly toward each other, thereby urging the cutting edge of the rear plunger assembly against an edge of the cartridge as the plunger plate is driven against the cartridge to expel the viscous material from the cartridge.

20 Claims, 21 Drawing Sheets

(56) References Cited

U.S. PATENT DOCUMENTS

| | | | | |
|---|---|---|---|---|
| 2009/0145986 | A1* | 6/2009 | Lind | B05B 5/1691 222/327 |
| 2013/0037567 | A1* | 2/2013 | Zahr | B05C 17/0106 222/80 |
| 2018/0290165 | A1* | 10/2018 | Herman | B05B 12/004 |
| 2025/0058348 | A1* | 2/2025 | Mok | B05C 17/0106 |

* cited by examiner

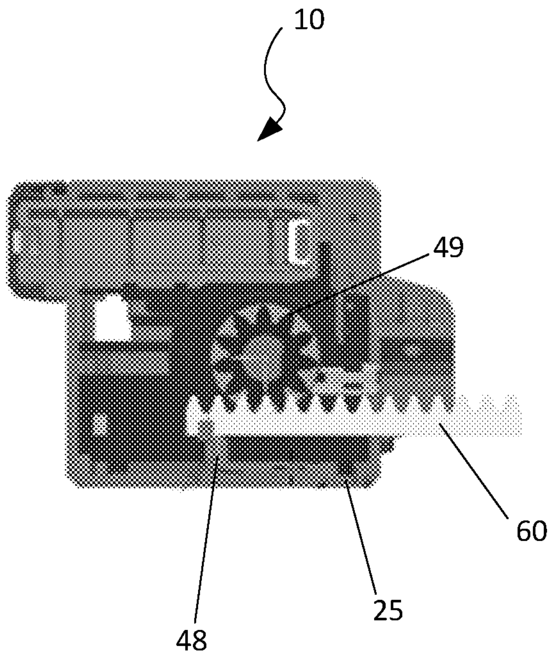
Fig 2C (i)
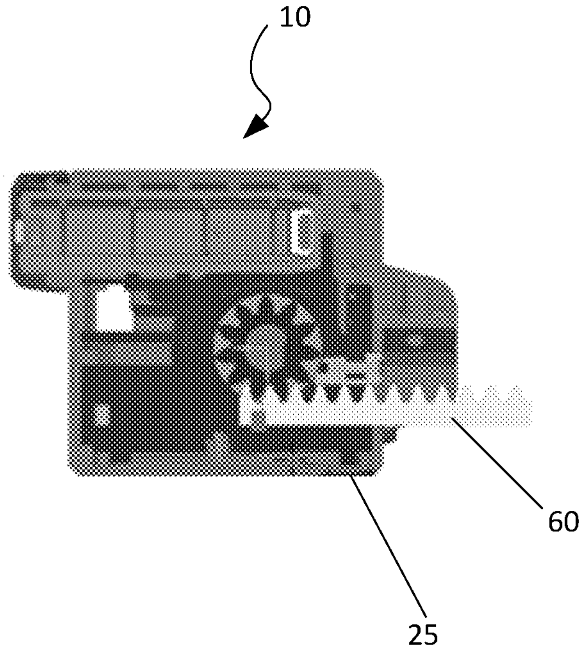
Fig 2C (ii)

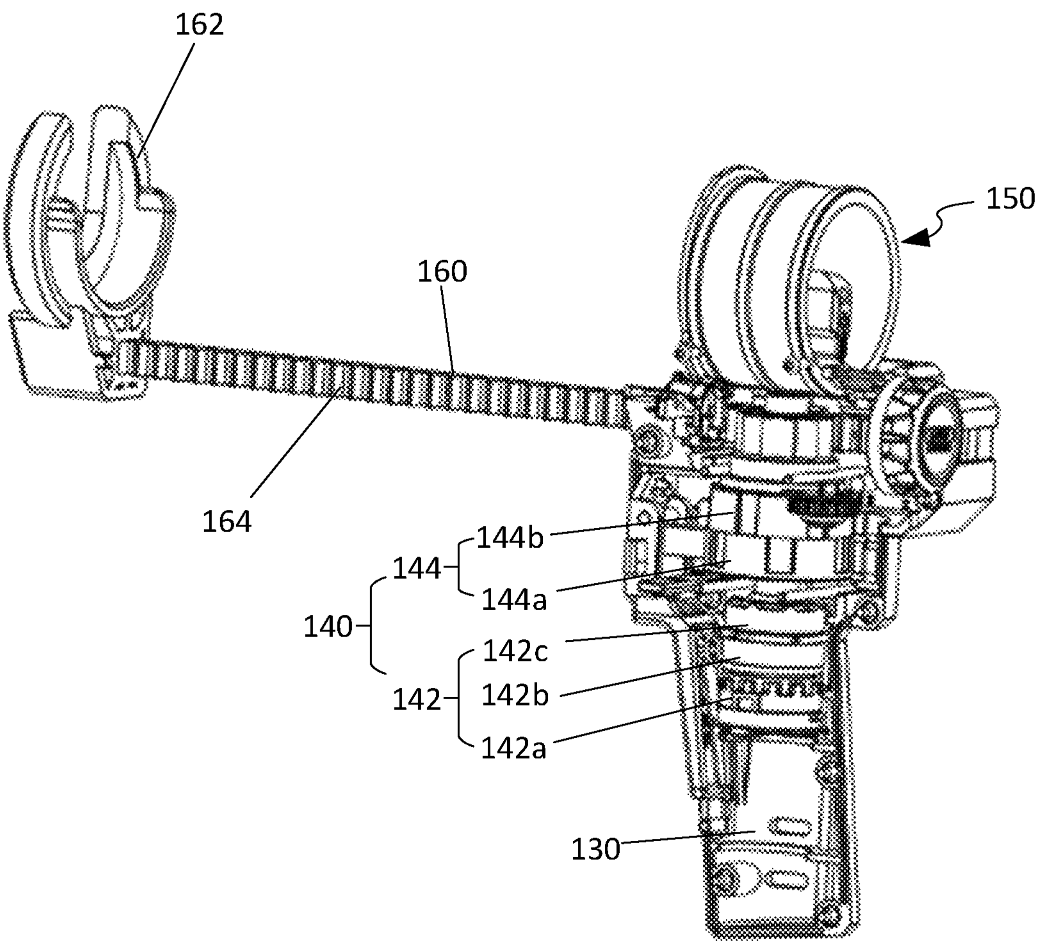
Fig 4B (ii)

MOTOR OPERATED DISPENSING DEVICE WITH CUTTING BLADE

CROSS-REFERENCE TO RELATED APPLICATIONS

This application claims priority under 35 U.S.C. § 119 to Hong Kong Application No. HK OGP 220323077786.8, filed on Aug. 18, 2023, the entire content of which is incorporated by reference herein.

FIELD OF THE DISCLOSURE

The present disclosure relates to a hand held viscous material dispensing device.

BACKGROUND OF THE DISCLOSURE

Cartridges containing viscous material such as gels, glues, caulk, silicone or sealants or pastes provide a convenient selection of materials used for filling gaps or sealing cracks in construction or maintenance projects on building sites all around the world. Application of these materials waterproof or seal around window frames, reduce the flow of heat into/out of the home, fill cracks or seal surfaces and are vital in finishing a variety of construction projects.

Typically, material in these cartridges are applied using a manually actuated or motor driven caulking gun or silicone gun. Such applicator devices expel viscous material from the cartridge through a nozzle of the cartridge into the crack or onto the work surface.

One common arrangement of manual cartridge application tools, typically known as caulking guns, is a lever which is grasped by a user. Typically, the grasping by the user urges a plunger against one end of the cartridge which is retained in the barrel of the caulking gun, shortening the effective length of the cartridge and expelling the viscous material from the tip through a nozzle. Other arrangements may be configured so that grasping of a lever by the user drive the cartridge back against a fixed base, thereby urging viscous material from the nozzle.

Unfortunately, such arrangements can be somewhat unwieldy and cumbersome to use, especially the first which requires a plunger which extends to a maximum of around twice the length of the cartridge. The levers may also be hard to operate for users with weaker grip strength. In either arrangement, the application of pressure to the cartridge can be difficult to control, resulting in an excess or intermittent flow of viscous material onto the work surface during operation.

Alternative arrangements of motor driven cartridge application devices have been devised in which a push plate and cartridge are driven relative to each other by various motorized arrangements including detachable powered drills mounted to a housing. However, such arrangements are typically relatively cumbersome and bulky; and may be difficult to operate by users to obtain the desired control over the expulsion of viscous material onto the work surface.

Accordingly, there is a need for a hand held viscous material dispensing device which addresses or at least partially ameliorates at least some of the above problems, or at least provides the members of the public with a useful choice.

SUMMARY OF THE DISCLOSURE

The present disclosure provides, in one aspect, a dispensing device for dispensing a viscous material from a cartridge received in the dispensing device. The dispensing device includes a main housing, a front support, a rear plunger assembly, a motor, and a gear assembly. The rear plunger assembly is spaced apart from the front support by an elongate member to receive and retain the cartridge inserted between the front support and the rear plunger assembly. The rear plunger assembly includes a plunger plate supported in a plunger housing above a cutting edge. The rear plunger assembly is rotatable about an axis that is parallel to a longitudinal axis of the elongate member. The motor and the gear assembly are disposed in the main housing and are engageable with the elongate member to move one of the front support and the rear plunger assembly toward each other, thereby urging the cutting edge of the rear plunger assembly against an edge of the cartridge as the plunger plate is driven against the cartridge to expel the viscous material therefrom.

The present disclosure provides, in another aspect, a dispensing device for dispensing viscous material from a cartridge received therein. The dispensing device includes a main housing, a front support, and a motor disposed in the main housing. The rear plunger assembly is spaced apart from the front support by an elongate member to receive and retain the cartridge inserted in the dispensing device. The rear plunger assembly includes a plunger plate that is supported in a plunger housing above a cutting edge. The rear plunger assembly is rotatable about an axis that is parallel to a longitudinal axis of the elongate member. The motor is configured to provide a rotational output to the elongate member to move one of the front support and the plunger plate toward each other, thereby urging the cutting edge of the rear plunger assembly against an edge of the cartridge as the plunger plate is driven against an end of the cartridge to expel the viscous material from the cartridge.

The present disclosure provides, in another aspect, a dispensing device for dispensing a viscous material from a cartridge received in the dispensing device. The dispensing device includes a main housing, a front support, an elongate member coupled to the front support, a rear plunger assembly coupled to an opposite end of the elongate member, a motor, and a gear assembly disposed in the main housing. The cartridge is received between the front support and the rear plunger assembly. The rear plunger assembly includes a plunger plate and a cutting edge supported in the plunger housing. The motor and the gear assembly are engageable with the elongate member to move one of the front support and the plunger plate toward each other, thereby urging the cutting edge against an edge of the cartridge as the plunger plate is driven against an end of the cartridge to expel the viscous material therefrom.

BRIEF DESCRIPTION OF THE DRAWINGS

FIG. 2C (i) is a section view of the mechanism of FIG. 2A.

FIG. 2C (ii) is a section view of the mechanism of FIG. 2A.

FIG. 4B (ii) is a perspective view of a portion of the device of FIG. 4A.

DETAILED DESCRIPTION

Figure 1A:
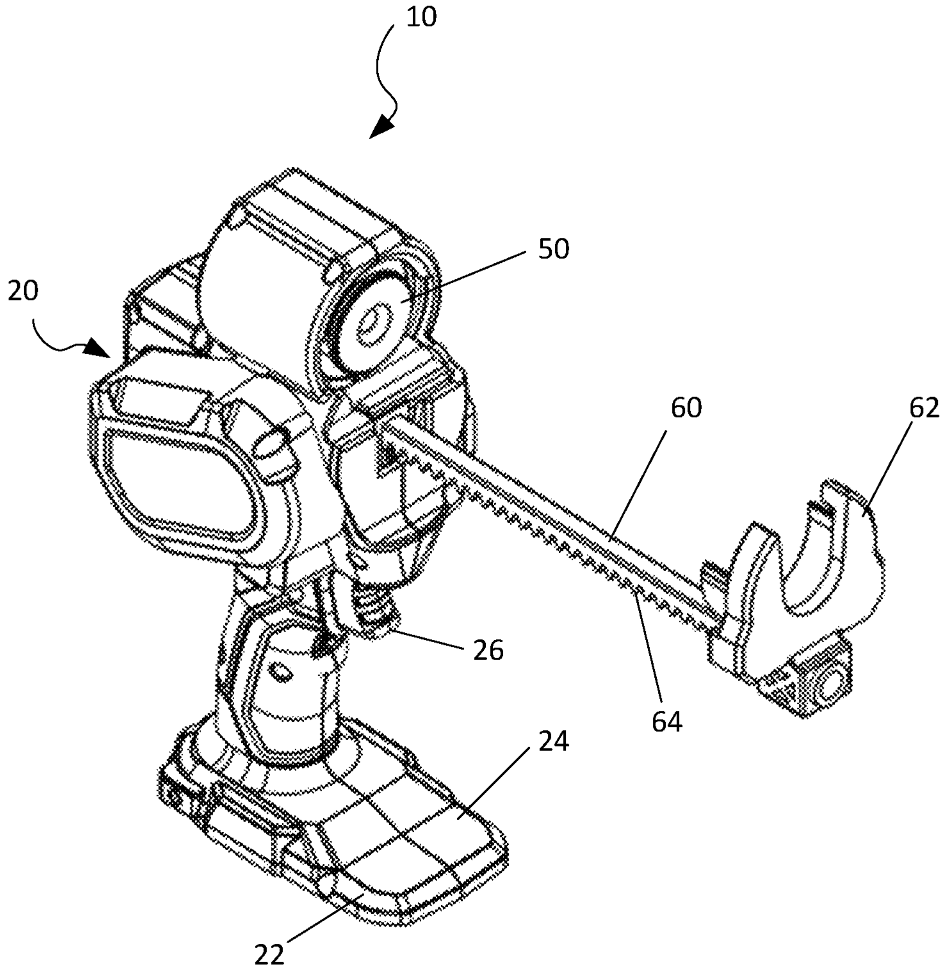
FIG. 1A is a perspective view of a dispensing device.
Figure 1B:
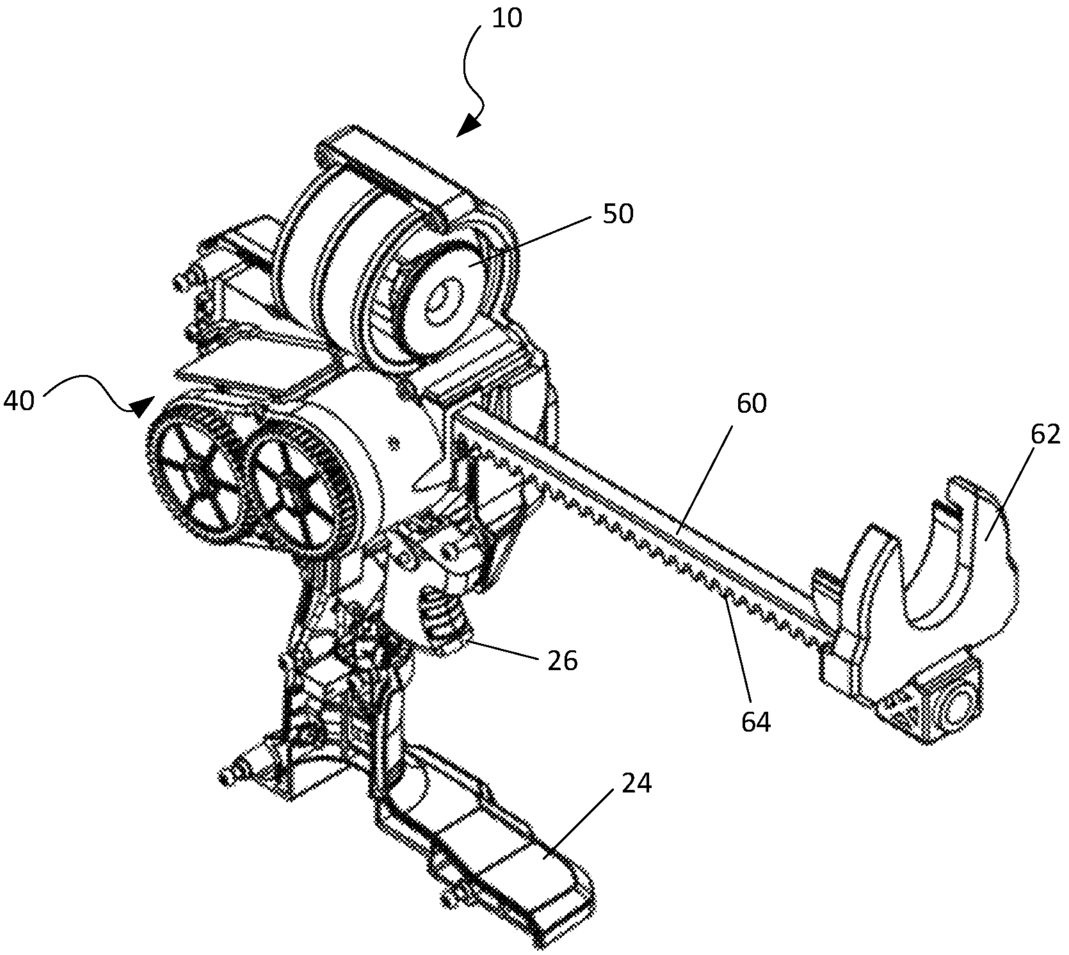
FIG. 1B is a perspective view of a portion of the dispensing device of FIG. 1A.
Figure 1C:
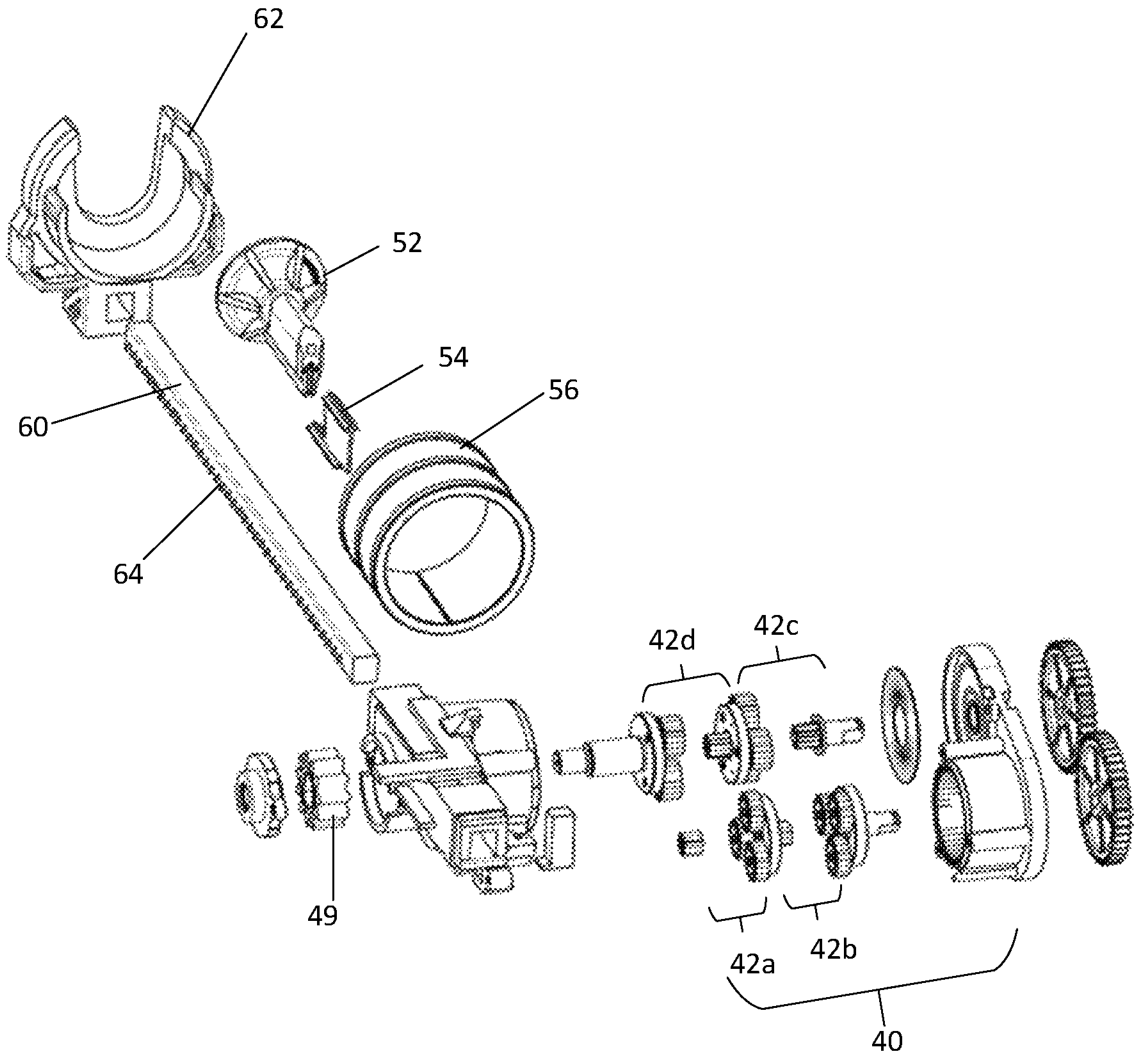
FIG. 1C is an exploded rear perspective view of the dispensing device of FIG. 1A.
Figure 1D:
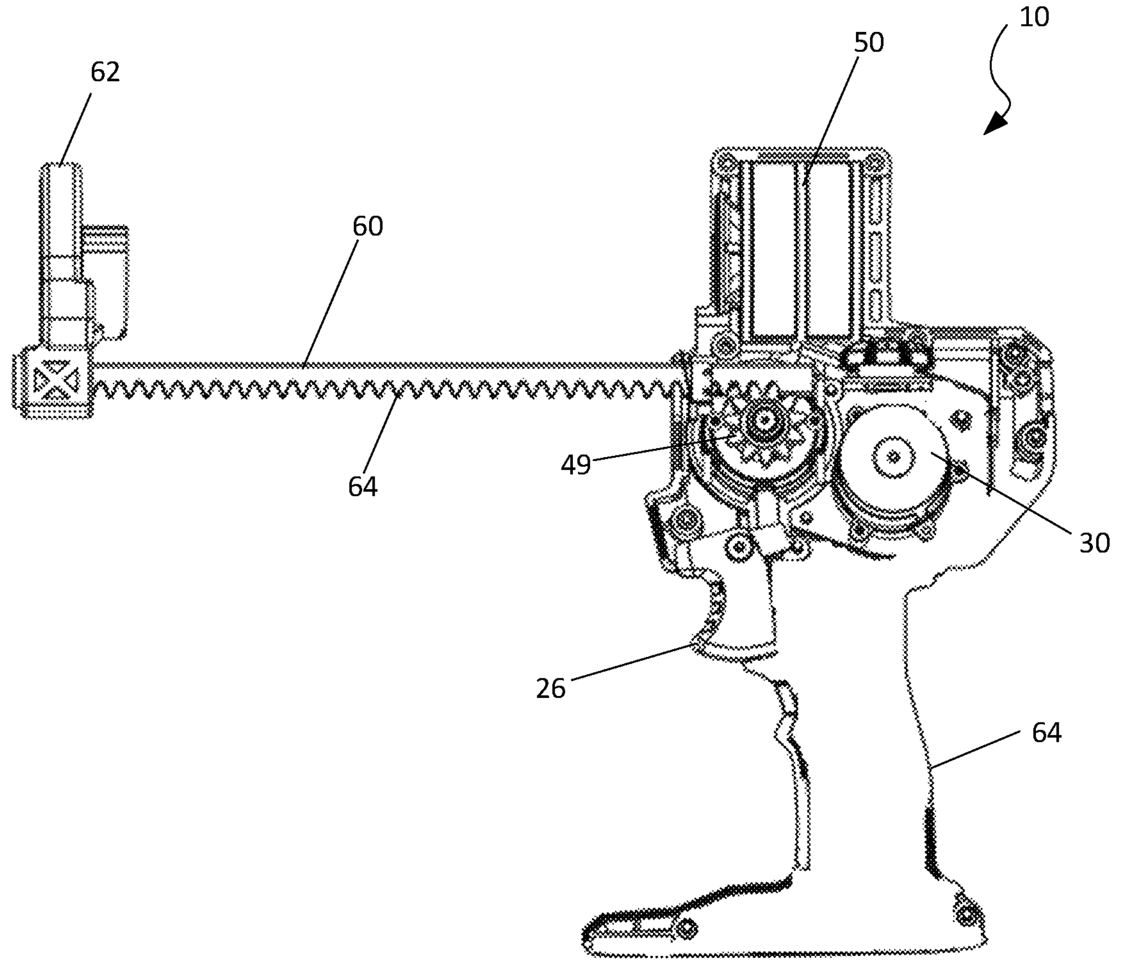
FIG. 1D is a side view of a portion of the dispensing device of FIG. 1A.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The disclosed technology addresses the need in the art for an improved dispensing device which is reduced in size and which provides an easy to use and control alternative to other dispensing devices.

Referring to the FIGS. 1A-1D, there are depicted various views of the dispensing device according to a first embodiment of the present disclosure, without the cartridge of viscous material for clarity purposes.

As depicted, the device 10 includes a main housing 20 comprising a right housing 22 and left housing 24. A trigger switch 26 is received between these housings, and this switch is arranged to be actuated by the user's finger to provide power from the battery or power cell (not shown) to drive the motor 30 and gear assembly 40.

The plunger assembly 50 is received in the top of the main housing 20 above the motor 30 and gear assembly 40 as described herein. An elongate member 60 is received in the main housing at one end. A front support 62 is attached to the other end of the elongate member 60.

In one embodiment, the elongate member 60 is a toothed rack which is driven by a pinion gear 49 of the gear assembly 40 upon actuation of the motor 30.

Typically, the front support 62 is spaced far enough apart from the rear plunger assembly 50 to receive full standard sized cartridges of viscous material and retain these cartridges with the neck of the cartridge and base of the nozzle resting in the front support 62, whilst the base of the cartridge contacts the plunger assembly 50.

Advantageously, as depicted, the rear plunger is disposed in the main housing. As can be seen especially with reference to FIGS. 1C and 1D, the motor 30 and gear assembly 40 are disposed substantially within the handle shaped portion of the main housing.

As depicted, in an exemplary arrangement the gear assembly 40 comprises four layers of planetary gears, a first layer of planetary gears 42*a*, a second layer of planetary gears 44*b*, a third layer of planetary gears 42*c* and a fourth layer of planetary gears 42*d*.

As can be also seen in FIG. 1C, and FIGS. 7A-7C, the plunger assembly 50 comprises a plunger plate 52 supported by a cutting edge 54 in a housing 56.

As is described further herein, in the embodiment depicted the actuation of the motor 30 by the user activating the trigger 26 retracts the front support 62 of the elongate member 60 towards the rear plunger assembly 50. Teeth of spur gear 49 mesh with corresponding teeth 64 of the elongate member 60, changing the rotational motion of the gear assembly 40 into linear motion of the elongate member 60. As is known to persons skilled in the art, changing the direction of rotation of the motor will change the direction of travel of the elongate member 60 relative to the housing.

The rear plunger assembly 50 is thus urged against an end or base of the cartridge, which drives the plunger plate 52 inside the cartridge toward the nozzle and thereby extrudes the viscous material in the cartridge onto the work surface.

In each of the embodiments described herein, as the front support and rear plunger assembly are driven towards each other, the rear plunger assembly is arranged to cut into the side of the cartridge. In the first and second embodiments, the cutting of the cartridge by the rear plunger assembly enables the front support to be retracted towards the rear plunger assembly as the elongate member is driven via the gear assembly by the motor. In the third embodiment described herein the rear plunger assembly is driven via the gear assembly by the motor toward the front support.

As depicted in FIGS. 2A-2D, in an optional arrangement, the device 10 may be configured such that the elongate member 60 may be disengaged from the housing 20. This further assists in reducing the size taken up the dispensing device when stored. As depicted, the user actuates a disengagement button 25 and then pulls the elongate member 60 to release it.

Figure 2A:
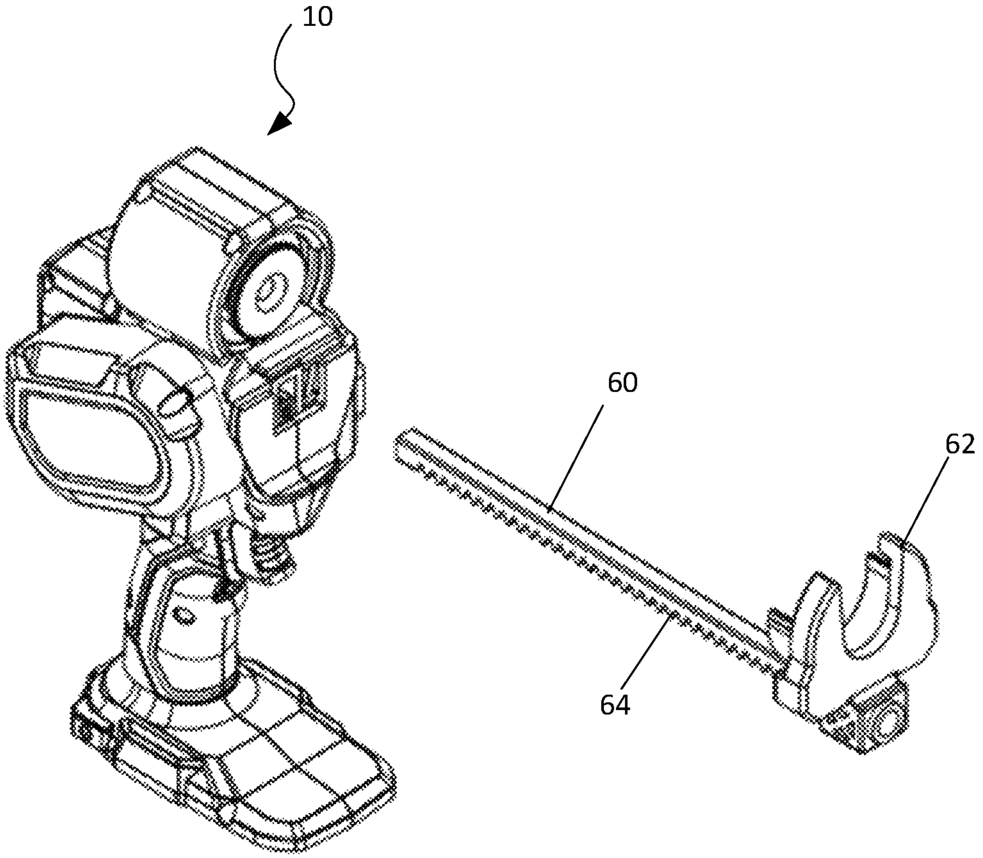
FIG. 2A is a perspective view of the dispensing device of FIG. 1A.
Figure 2B:
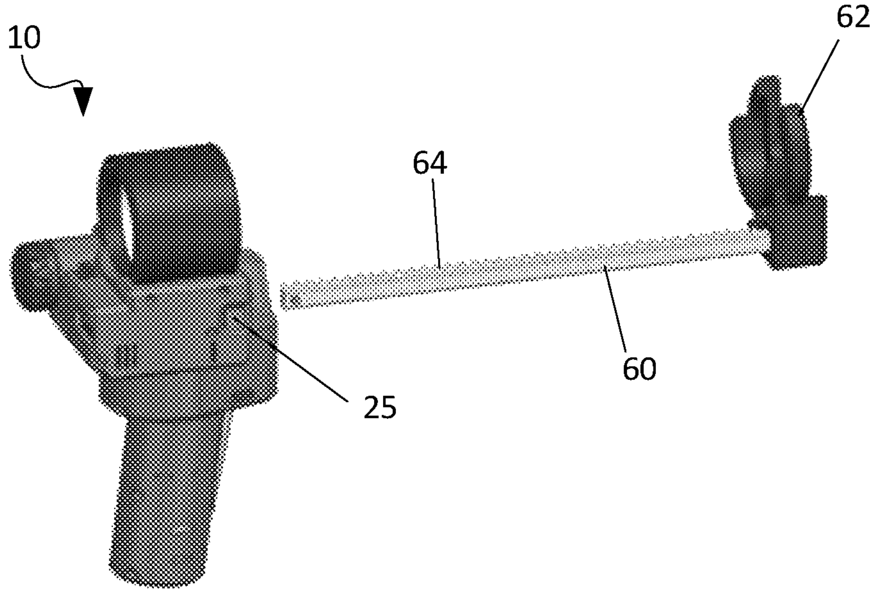
FIG. 2B is a perspective view of a portion of the device of FIG. 2A.

As can be seen, particularly in FIG. 2C (i), the elongate member 60 cannot be pulled out from the main housing as the pin 48 is engaged with the end of the elongate member 60. Upon actuation of the disengagement button 25 by the user, this button pivots within the housing and lifts the pin 48 out from engagement with the end of the elongate member 60 as shown in FIG. 2C (ii). This means that the elongate member 60 can then be removed from the housing as depicted in FIG. 2B.

Figure 2D:
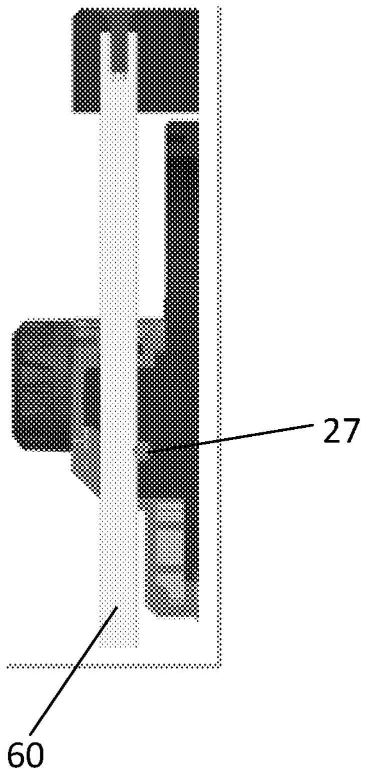
FIG. 2D is a section view of a friction gripping member for opposing motion of the elongate member.

As depicted in FIG. 2D, a rubber rod 27 may further be disposed in the housing and arranged to bear against the elongate member 60. This rod is depicted in storage configuration in the figure, but it would be appreciated that this rod is configured to provide frictional engagement of the elongate member and prevent it moving backwards and forwards during normal operation too easily relative to the main housing.

Figure 3A:
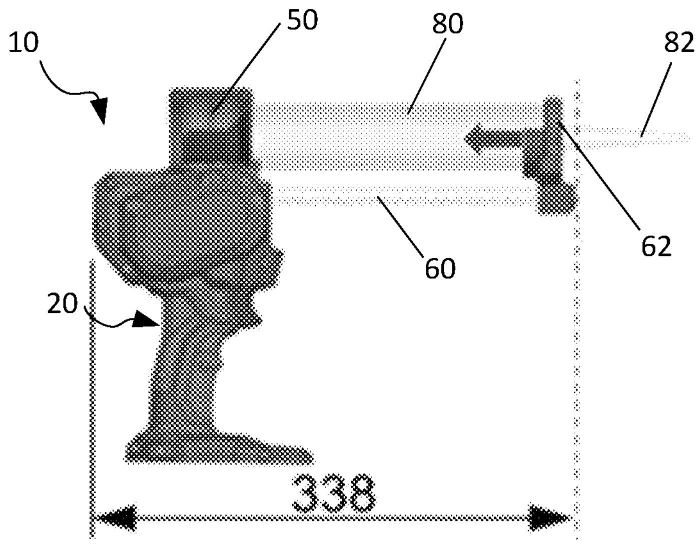
FIG. 3A is a side view of the dispensing device of FIG. 1A in an extended state.

Advantageously, as depicted in FIG. 3A, the length of the device can be configured so that the length from the front support to the end of the main housing in an extended state of between 330 mm and 350 mm. An exemplary full cartridge of viscous material 80 is shown for reference, received between the rear plunger assembly 50 and the front support member with the nozzle 82 protruding forwards. It would be appreciated that length of the elongate member and/or the physical size parameters of the housing may be selected so as to provide these dimensions. In the Figure depicted the length is 338 mm, but it would be appreciated that other sizes in the range of 280 mm-370 mm could also be selected, and more preferably 300 mm-350 mm.

Figure 3B:
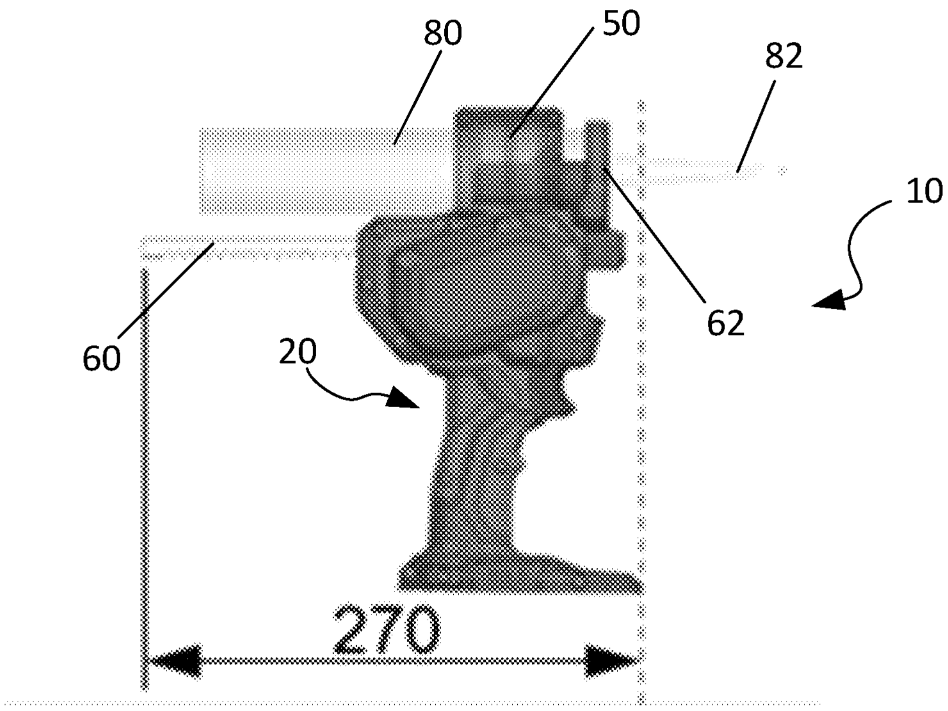
FIG. 3B is a side view of the dispensing device of FIG. 1A in an extended state with a cartridge which is almost empty of viscous material received therein.

Preferably, as depicted in FIG. 3B, in the retracted state shown where the cartridge 80 is empty of viscous material, the length from the front of the main housing to the end of the at least one elongate member is approximately 240 mm-300 mm, and preferably 260 mm-280 mm. More particularly, in the embodiment depicted the length is 270 mm.

Figure 4A:
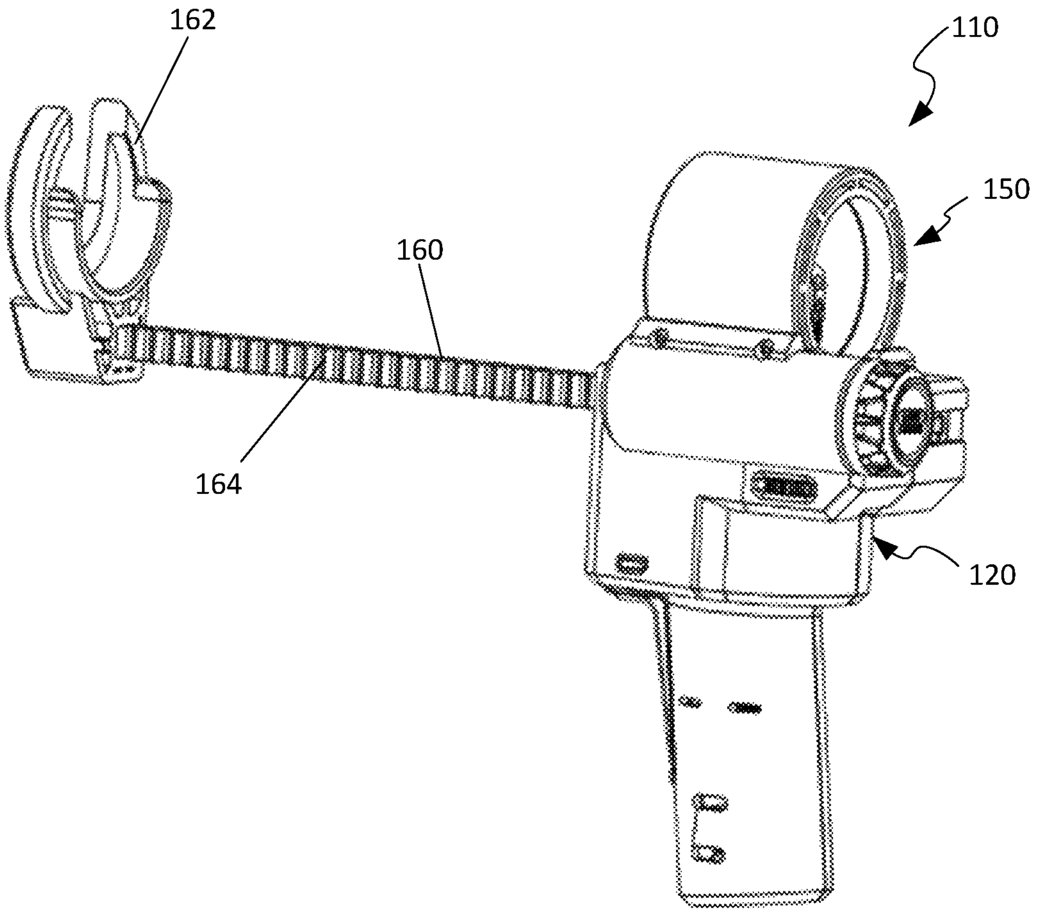
FIG. 4A is a perspective view of another embodiment of a dispensing device.
Figure 4B:
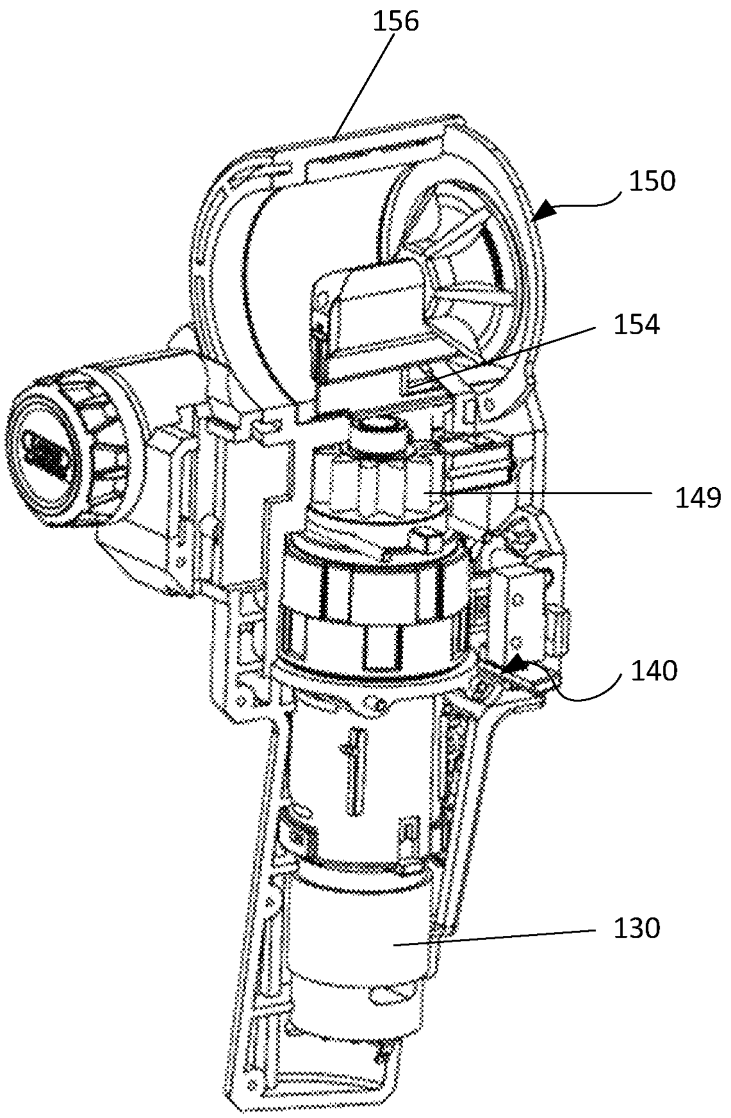
FIG. 4B (i) is a perspective view of a portion of the device of FIG. 4A.
Figure 4C:
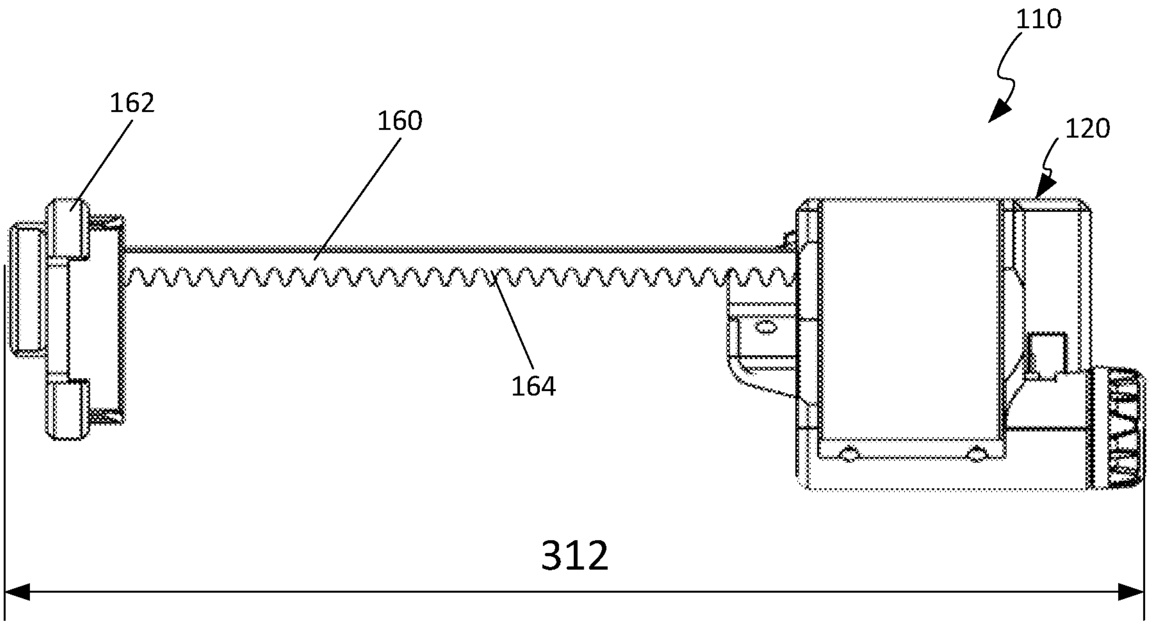
FIG. 4C is a top view of the device of FIG. 4A.

In a further embodiment of the present disclosure, there is depicted in FIG. 4A-FIG. 4C a smaller version of the first embodiment of the device 110 described herein in which the front support 162 is also moveable towards and away from the rear plunger assembly 150. As depicted, the front support 162 is spaced apart from the main housing 120 by elongate member 160. Preferably, the elongate member 160 is a toothed rack which is driven by spur gear 149 of the gear assembly 140 upon actuation of the motor 130.

A rear plunger assembly 150 is disposed in the main housing 120, above the motor 130 and gear assembly 140 which in this embodiment is small enough such that it is substantially disposed in the handle under the rear plunger assembly 150. It would be appreciated that a user can grip the housing with their fingers. Layers of planetary gears 142*a*, 142*b*, 142*c* are arranged above the motor 130. These mesh with further layers of planetary gears 144*a*, 144*b* which in turn drive spur gear 49 to mesh with the teeth of the elongate member in a rack and pinion type arrangement.

As shown in FIG. 4C, preferably the device has a length from the front support to the end of the main housing of approximately 280 mm-340 mm, and optionally between 300 mm-320 mm, and more particularly in an exemplary arrangement this length is 312 mm.

In a third embodiment of the device 210 depicted in FIGS. 5A-5D, the rear plunger assembly 250 is driveable on an elongate member 260 (in this case a threaded rod) towards and away from a stationary front support 262 of a cartridge.

The motor 230 and gear assembly 240 are disposed under the rear plunger assembly 250. In this embodiment, actuation of the switch 226 causes the motor 230 to drive the threaded rod 260 via the gear assembly 240. Advantageously, the elongate member 260 is an externally threaded rod coupled via the gear assembly to the motor via a lead screw nut 266 movable thereon. Rotation of the motor 230 drives the rear plunger assembly 260 either towards or away from the front support depending on the direction of motor rotation, in lead screw arrangement familiar to persons skilled in the art.

In this embodiment the frame 265 comprising additional elongate stiffening member 264 which assists in receiving and retaining the cartridge between the rear plunger assembly 250 and the front support 262. It also helps to prevent the rear plunger assembly 250 from rotating with the elongate member 260.

Figure 5A:
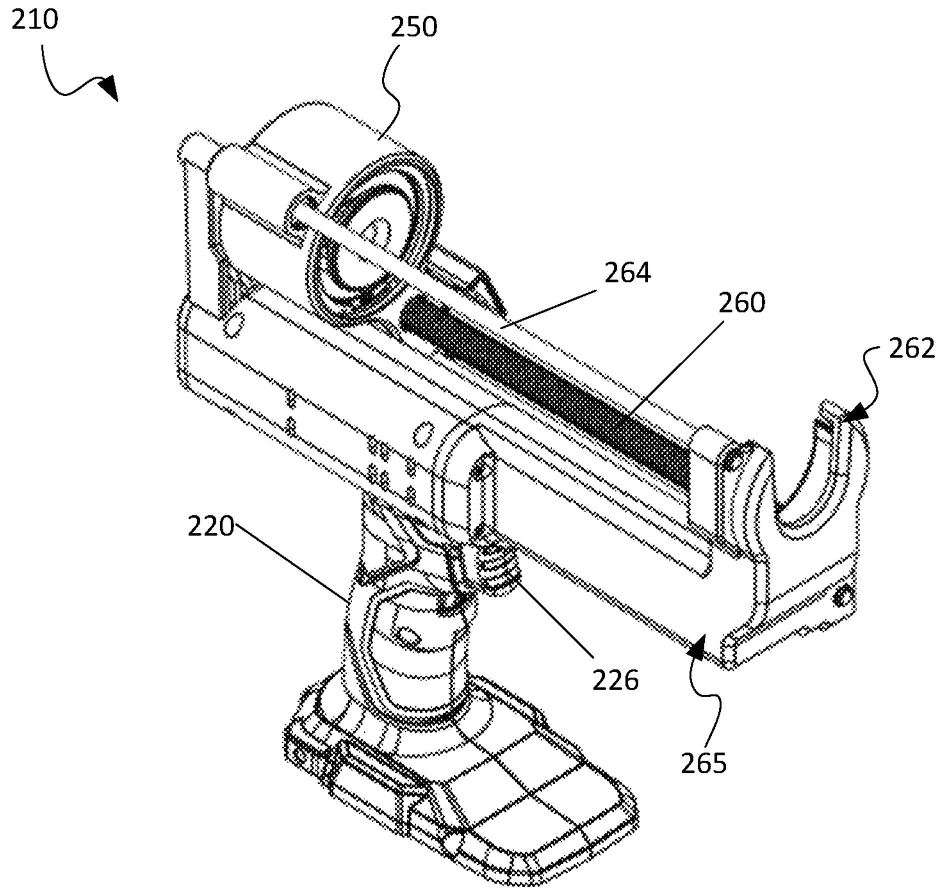
FIG. 5A is a perspective view of another embodiment of a dispensing device.
Figure 5B:
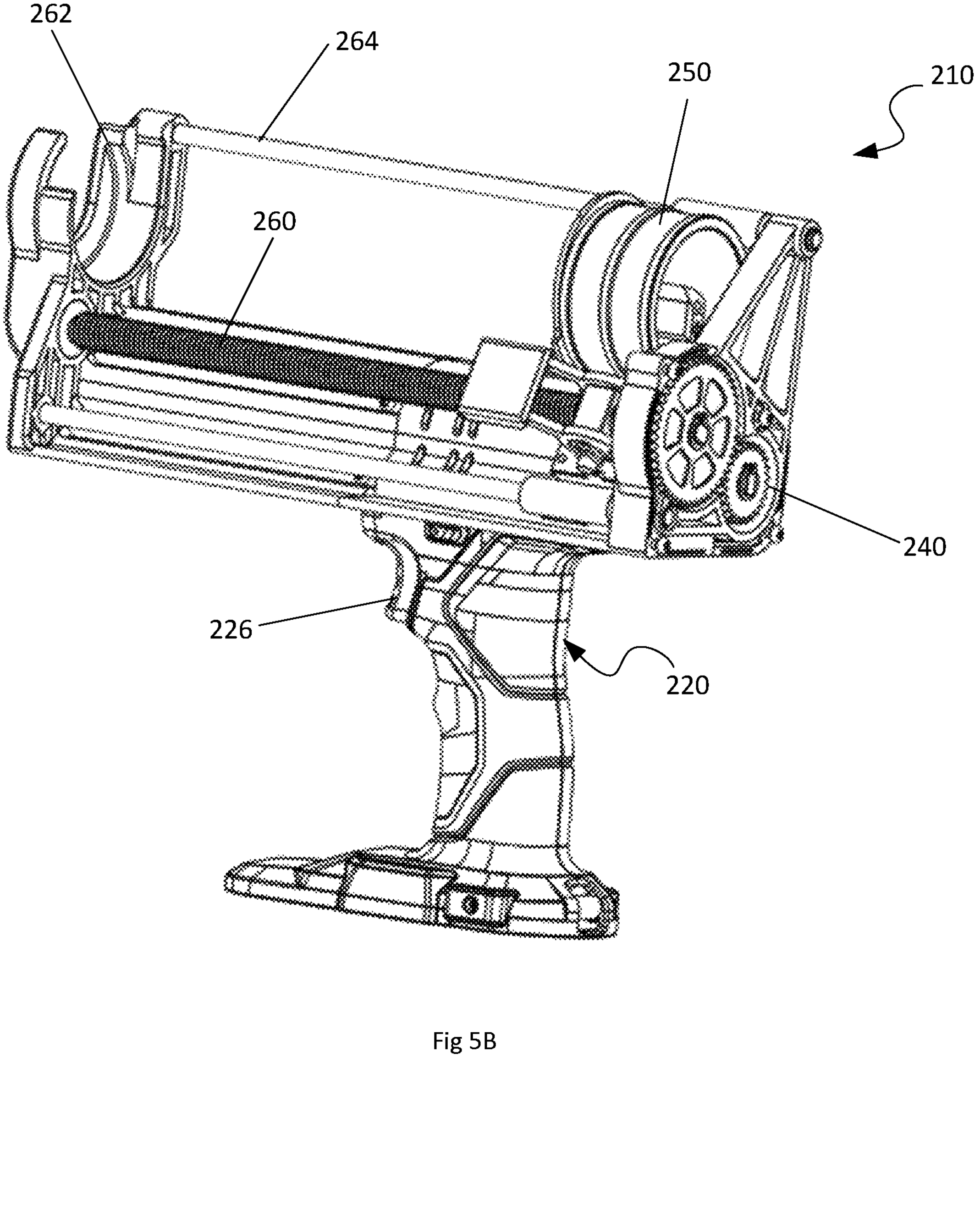
FIG. 5B is a perspective view of a portion of the dispensing device of FIG. 5A.
Figure 5C:
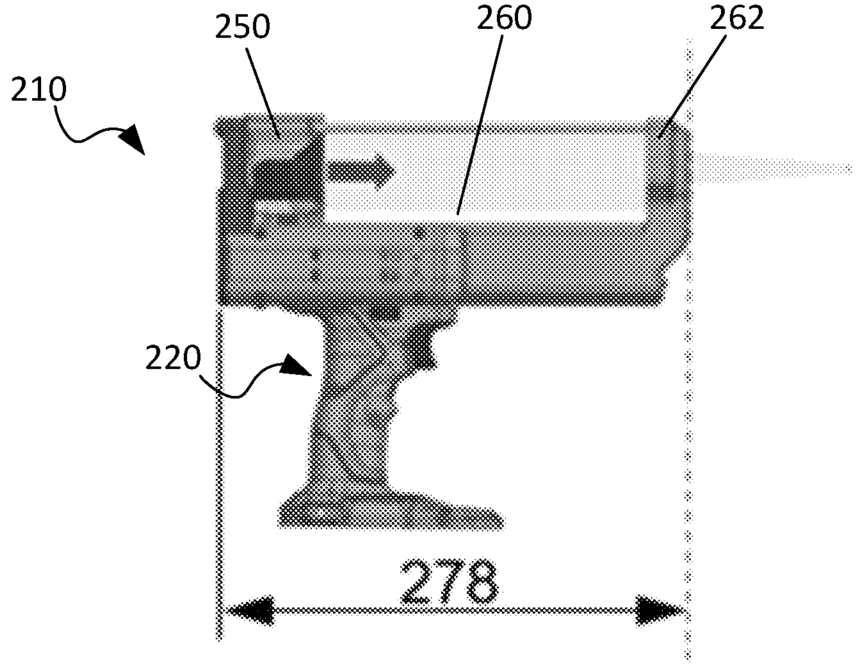
FIG. 5C is a side view of the dispensing device of FIG. 5A.
Figure 5D:
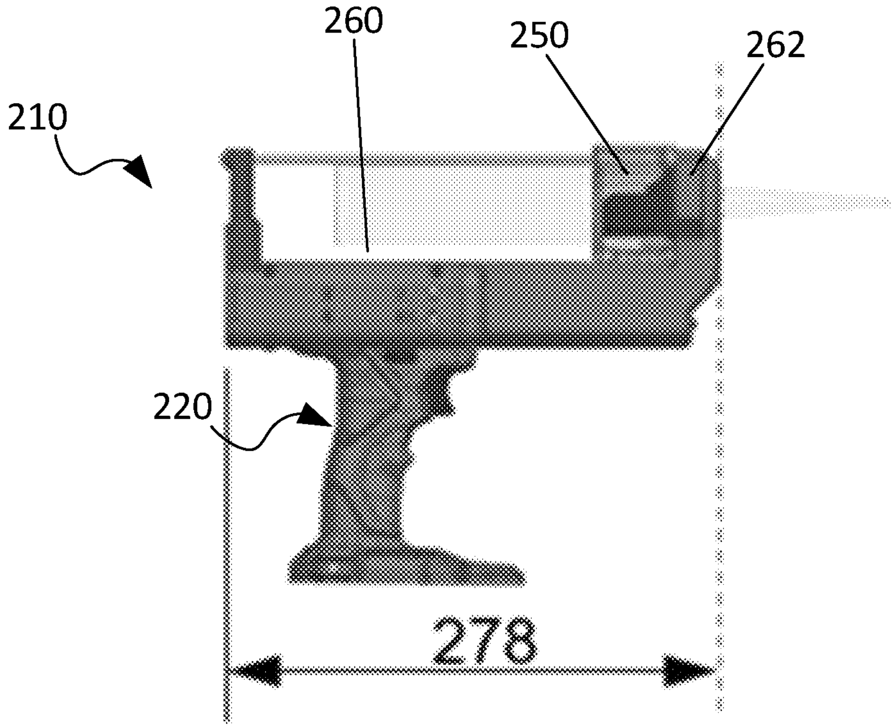
FIG. 5D is a side view of the dispensing device of FIG. 5A.

As depicted in FIG. 5C and FIG. 5D in an exemplary embodiment, the device has a length from the front support to the end of the main housing of between 250 mm and 300 mm, and optionally between 270 mm and 280 mm which does not change as the plunger moves from a retracted to extended state. More preferably, the device has a length of 278 mm as shown in the Figures. Thus, the length of the device is unchanged whether the cartridge is in the full state (as depicted in FIG. 5C) or in the empty state (as depicted in FIG. 5D).

Figure 6:
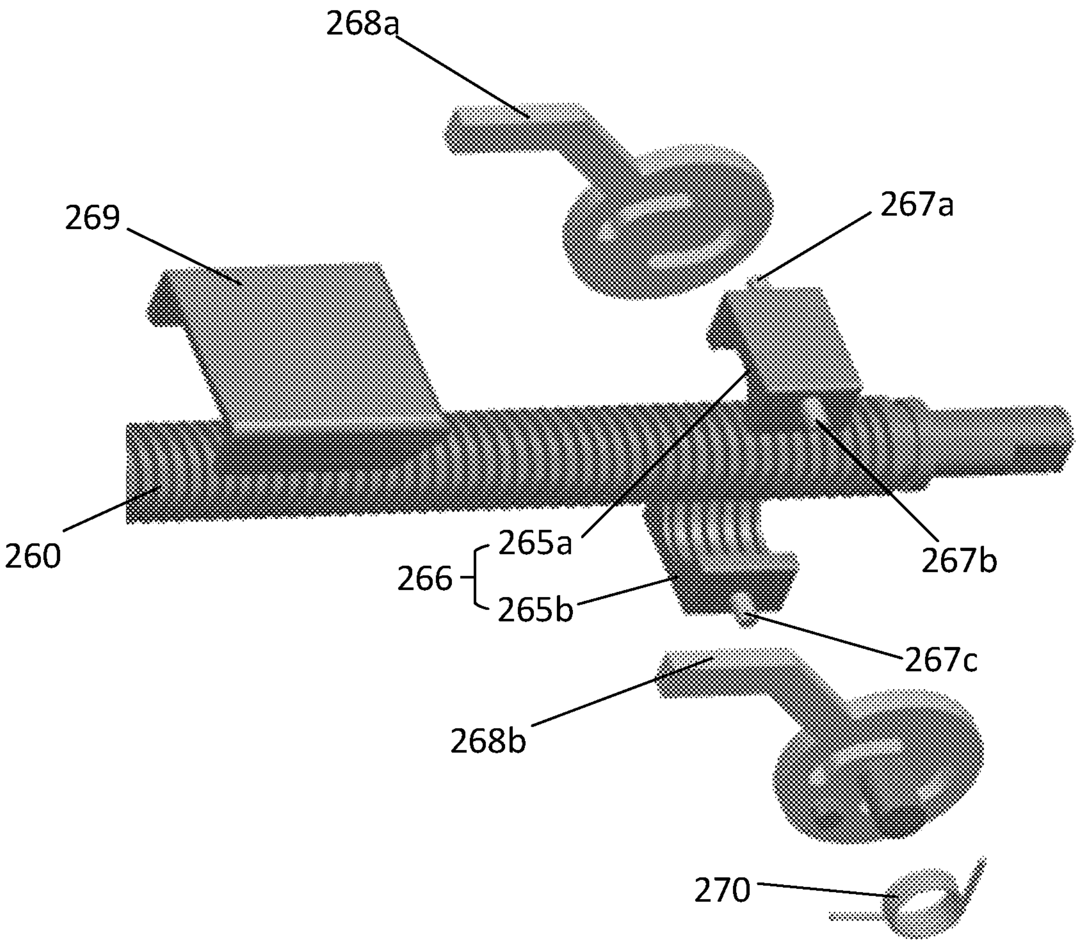
FIG. 6 is an exploded view of a quick release locking mechanism.
Figure 7A:
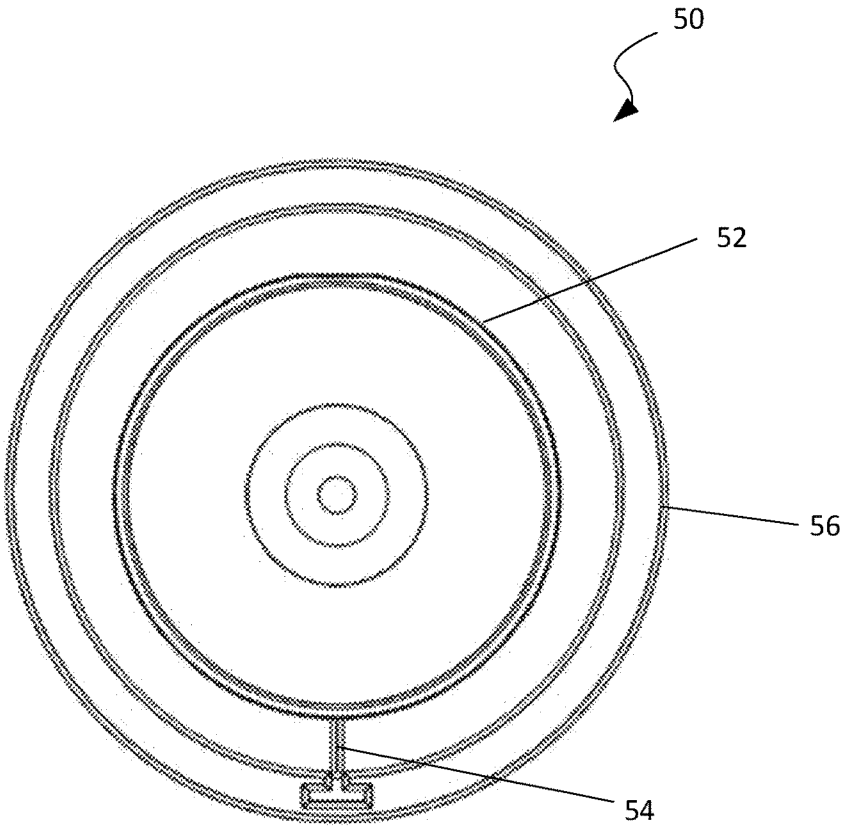
FIG. 7A is a front view of a plunger assembly.
Figure 7B:
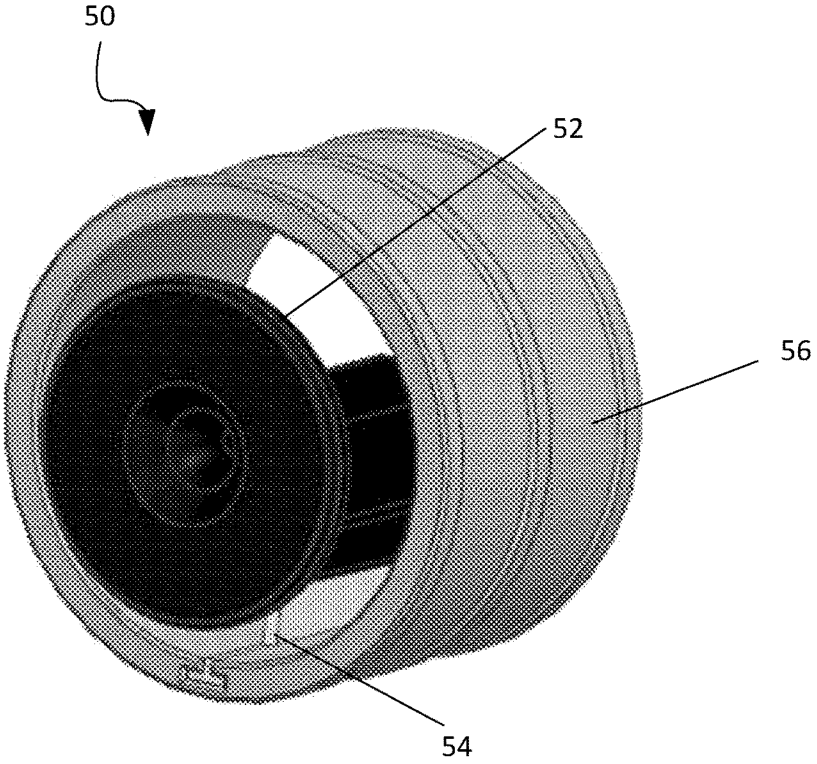
FIG. 7B is a perspective view of the plunger assembly of FIG. 7A.
Figure 7C:
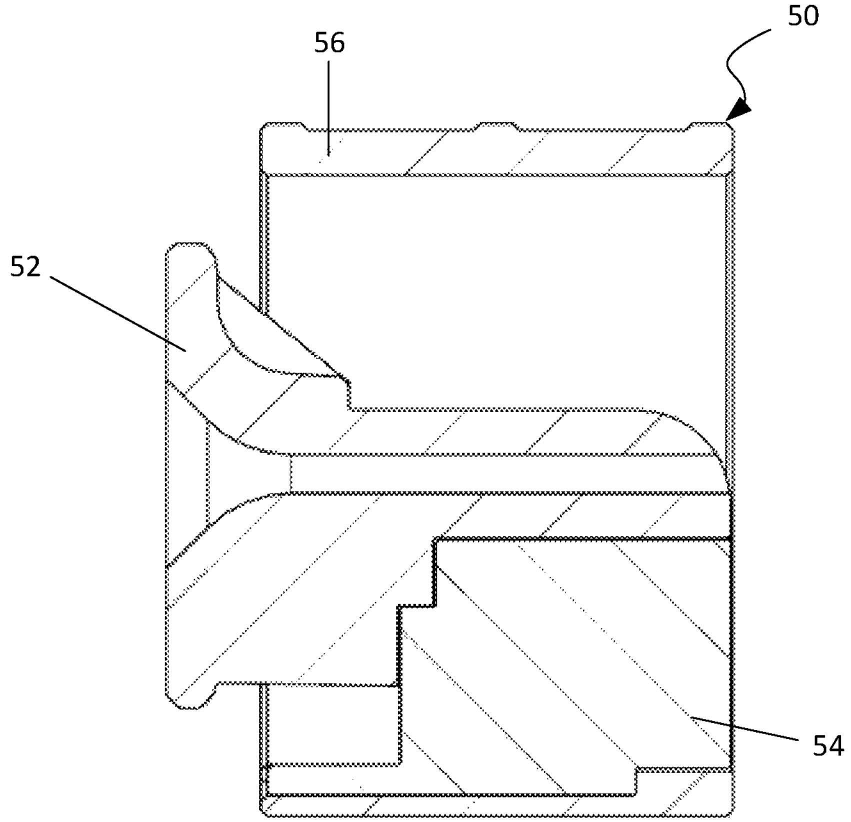
FIG. 7C is a section view of the plunger assembly of FIG. 7A.
Figure 7D:
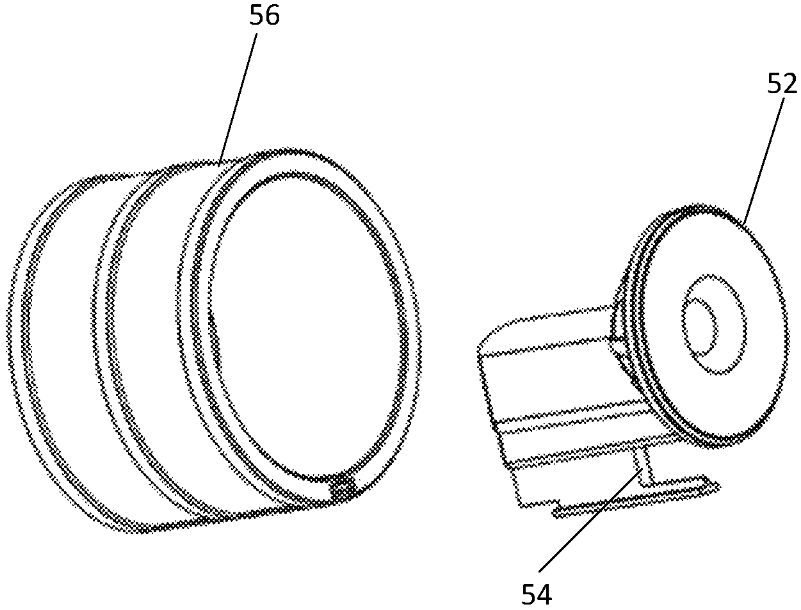
FIG. 7D is an exploded view of the plunger assembly of FIG. 7A.

In a further aspect of the third embodiment depicted in FIG. 6, there is depicted an exemplary quick release mechanism whereby the rear plunger assembly may be manually positioned on the elongate member 260 (threaded rod) by the user.

As shown, the lead nut 266 is formed by a pair of split nuts 265*a*, 265*b* which have corresponding threaded profiles to the thread of the elongate member 260. A pair of posts 267*a, b* and 267*c*, 267*d* (not shown) extend from the sides of each of the split nuts which are received in corresponding holes or slots formed in user actuable levers 268*a*, 268*b*. The split nuts are biased into engagement with each other and with the elongate member by a coil spring 270. This engagement of the split nuts with the threaded rod may be overcome by manual actuation of the levers 268*a*, 268*b* by a user urging the user actuable lever 269 in a direction of away from the elongate member 260.

Accordingly, the lead screw nut 266 comprising a pair of split nuts 265*a*, 265*b* are engageable and disengageable from the externally threaded rod 260 via the user actuable lever 269.

FIGS. 7A-7D depict an exemplary rear plunger assembly, which is configured in each of the embodiments described herein to be received in the main housing above the motor and gear assembly.

As depicted, the plunger assembly comprises a rear plunger plate 52 that is mounted above a cutting edge 54 inside a housing 56. As depicted the plunger plate is supported by the cutting edge 54 which is received within a recess defined in the plunger housing 56.

Advantageously, as shown the rear plunger assembly housing is generally circular in cross section. The plunger assembly is accordingly adapted to be rotatably received in a corresponding circular aperture having a relatively larger diameter defined in the main housing as is shown especially in FIGS. 8A, 8B herein. This means that the plunger housing and therefore the plunger assembly as a whole is not fixed in its orientation with respect to the main housing of the device. As such, the cartridge received between the front support and rear plunger assembly is able to be rotated in situ; so as to provide the orientation of the nozzle at the front of the cartridge desired by the user. In turn, this means that the orientation of the viscous material extruded by the device is easily configurable to the optimum orientation for that particular work surface; simply by manually rotating the barrel of the cartridge.

Figure 8A:
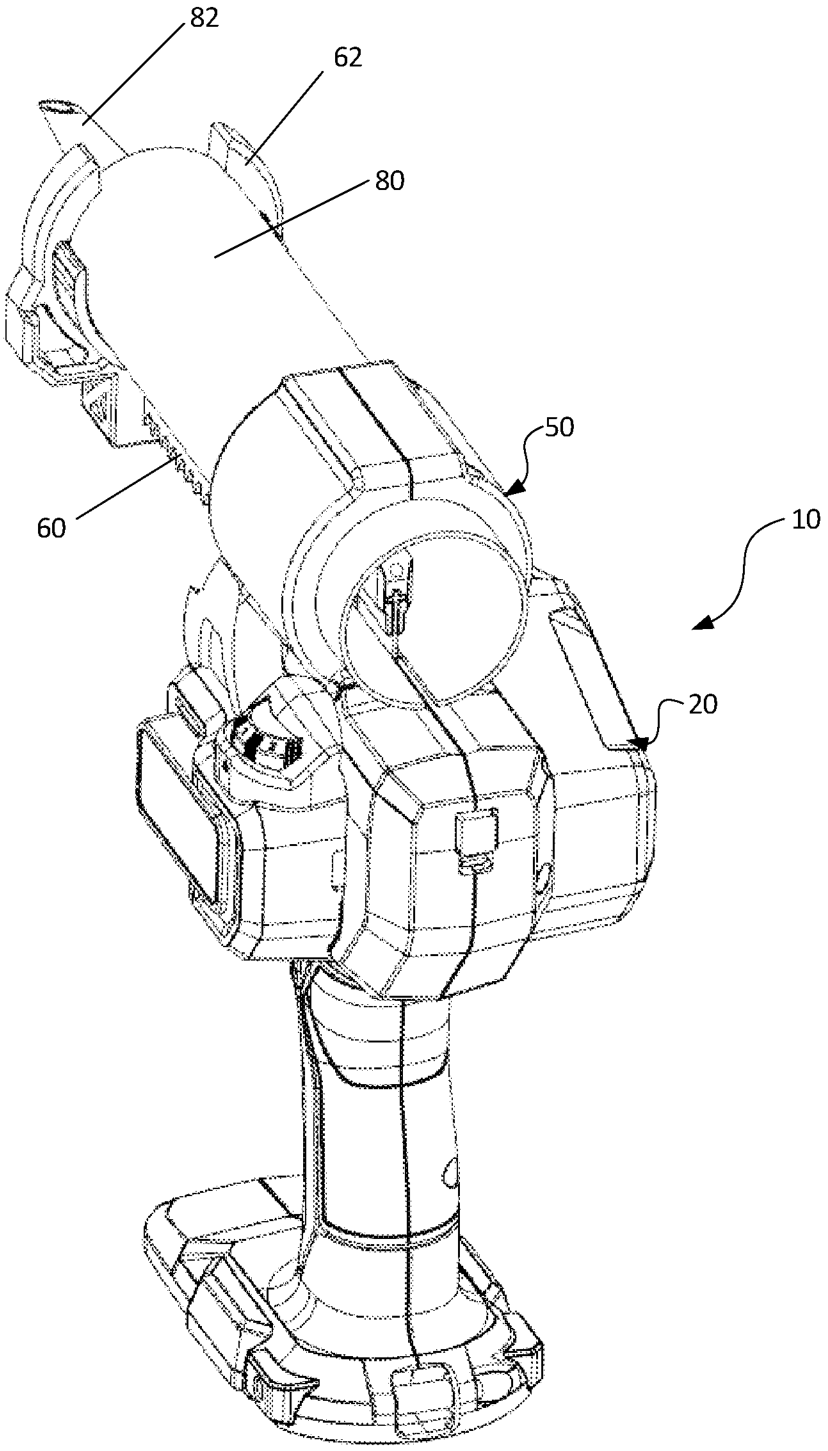
FIG. 8A is a perspective view of the device of FIG. 1A with a cartridge inserted therein and the tip in a first position.

FIG. 8A depicts a cartridge 80 received between the front support 63 and the rear plunger assembly 50 of a device according to either of the first or second embodiments of the present disclosure described herein. (It would be appreciated that same plunger assembly could also be used with the third embodiment described where the rear plunger assembly moves towards the front support on a threaded rod without departing from the scope of the present disclosure).

As depicted in FIG. 8A, the tip 82 of the cartridge has been cut by the user at an angle. The cutting edge 54 of the plunger assembly is essentially vertical in the exemplary orientation depicted. The cutting edge 54 has been urged by the movement of the front support towards the rear plunger assembly by driving the elongate member 60 via the motor 30 driving the gear assembly 40. The cutting edge as shown has cut into the cartridge 80; as the plunger plate 52 has urged the base of the cartridge further into the cartridge.

Figure 8B:
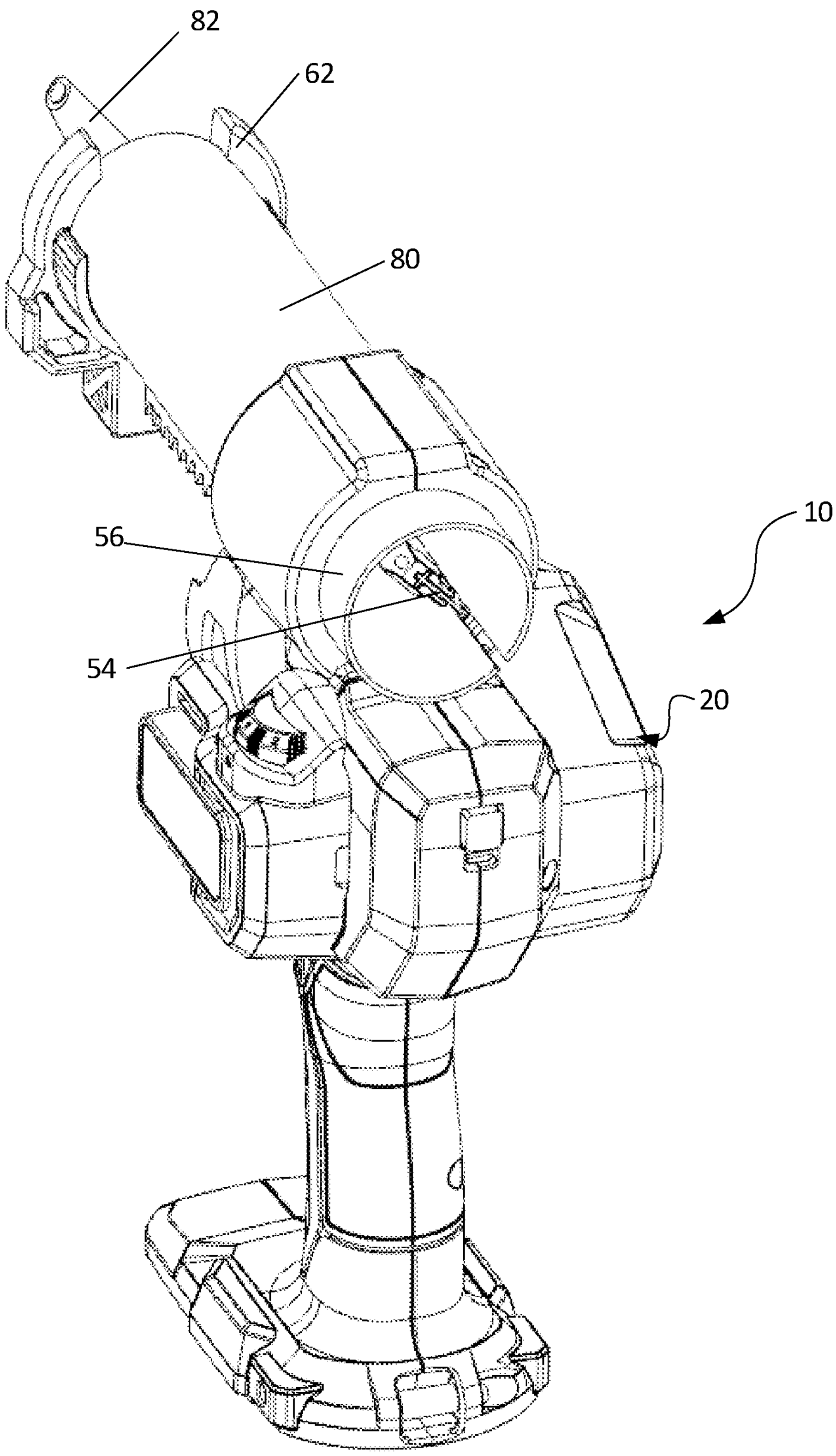
FIG. 8B is a perspective view of the device of FIG. 1A with a cartridge inserted therein and the rear plunger assembly rotated so that the tip is oriented in a second position.

FIG. 8B depicts the same device 10 as depicted in FIG. 8A, but wherein the angle of the cartridge 80 and the plunger assembly 50 has changed by the user rotating the cartridge and assembly relative to the main housing 20. It can be seen that the cutting edge 54 is now inclined relative to the vertical axis defined by the housing due to the rotation of the cartridge 80 and plunger assembly 50 within the housing 20.

The above embodiments are described by way of example only. Many variations are possible without departing from the scope of the disclosure as defined in the appended claims.

Advantageously, the dispensing device of the present disclosure provides a precisely controlled motor driven expulsion of the viscous material from the cartridge selected. It would be appreciated that through careful selection of the components of the motor and gear assembly that precise control over the force on the base of the cartridge may be achieved. In addition, the inclusion of optional friction pads which oppose motion of the elongate element in the first embodiment also enables responsive control over the expulsion of the viscous material from the dispensing device.

Further, the dispensing device allows for rotation of the cartridge 80 relative to device such that the tip is able to be directed to whatever orientation is most suitable to the crack or work surface to which the viscous material is being applied. In some uses, it may be preferable for the tip (usually cut any an angle) to be orientated with the shortest part of the inclined tip face proximate to the work surface, whereas in other uses it may be preferable for the shortest part of the tip face to be oriented to either side or even upwards. When using the device of the present disclosure the user is able to achieve all of these orientations by rotating the cartridge 80 relative to the device as they wish.

In the first and second embodiment of the present disclosure, the ability to remove the elongate element to which the front support is attached and store it separately from the main device further enables the overall size of the device when not in use to be minimized. This is especially useful when storing the device in a tool box, on the way to the job site or even on a shelf between uses.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A dispensing device for dispensing a viscous material from a cartridge received therein, the dispensing device comprising:

a main housing;

a front support;

a rear plunger assembly spaced apart from the front support by an elongate member to receive and retain the cartridge inserted therebetween, wherein the rear plunger assembly includes a plunger plate supported in a plunger housing above a cutting edge and the rear plunger assembly is rotatable relative to the main housing about an axis parallel to a longitudinal axis of the elongate member; and a motor and a gear assembly disposed in the main housing, the motor and the gear assembly engageable with the elongate member to move one of the front support and the rear plunger assembly toward each other, thereby urging the cutting edge of the rear plunger assembly against an edge of the cartridge as the plunger plate is driven against the cartridge to expel the viscous material therefrom.

2. The dispensing device according to claim 1, wherein the rear plunger assembly is disposed in the main housing.

3. The dispensing device according to claim 1, wherein the motor and the gear assembly are disposed under the rear plunger assembly and substantially within a handle shaped portion defined by the main housing.

4. The dispensing device according to claim 1, wherein the plunger housing is generally circular in cross section and is rotatably received in a corresponding circular aperture defined in the main housing.

5. The dispensing device according to claim 1, wherein the elongate member and the front support are detachable from the main housing.

6. A dispensing device for dispensing viscous material from a cartridge received therein, the dispensing device comprising:

a main housing;

a front support;

a rear plunger assembly spaced apart from the front support by an elongate member to receive and retain the cartridge inserted therebetween, wherein the rear plunger assembly including a plunger plate supported in a plunger housing above a cutting edge and the rear plunger assembly is rotatable relative to the main housing about an axis parallel to a longitudinal axis of the elongate member; and a motor disposed in the main housing and configured to provide a rotational output to the elongate member to move one of the front support and the plunger plate toward each other, thereby urging the cutting edge of the rear plunger assembly against an edge of the cartridge as the plunger plate is driven against an end of the cartridge to expel the viscous material therefrom.

7. The dispensing device according to claim 6, wherein the dispensing device has a length from the front support to an end of the main housing between approximately 280 mm and 340 mm.

8. The dispensing device of claim 7, wherein the length from the front support to the end of the main housing is between approximately 310 mm-320 mm.

9. The dispensing device according to claim 6, wherein the dispensing device has a length from the front support to an end of the main housing of between approximately 250 mm and 300 mm.

10. The dispensing device of claim 6, wherein the front support and the elongate member are movable relative to the main housing from an extended state to a retracted state.

11. The dispensing device according to claim 10, wherein the dispensing device has a length from the front support to an end of the main housing in the extended state of between approximately 310 mm and 360 mm.

12. The dispensing device of claim 11, the length from the front support to the end of the main housing in the extended state is between approximately 320 mm-340 mm.

13. The dispensing device according to claim 10, wherein the dispensing device has a length from a front of the main housing to the end of the elongate member between approximately 250 mm and 300 mm in the retracted state.

14. The dispensing device of claim 13, wherein the dispensing device has a length from a front of the main housing to an end of the elongate member approximately between 260 mm and 280 mm in the retracted state.

15. A dispensing device for dispensing a viscous material from a cartridge received therein, the dispensing device comprising:

a main housing;

a front support;

an elongate member coupled to the front support, a rear plunger assembly coupled at an opposite end of the elongate member, the cartridge received between the front support and the rear plunger assembly, the rear plunger assembly including a plunger plate and a cutting edge supported in a plunger housing, the plunger housing rotatablv received in an aperture defined in the main housing; and a motor and a gear assembly disposed in the main housing, the motor and the gear assembly engageable with the elongate member so as to move one of the front support and the plunger plate toward each other, thereby urging the cutting edge of the rear plunger assembly against an edge of the cartridge as the plunger plate is driven against an end of the cartridge to expel the viscous material therefrom.

16. The dispensing device according to claim 15, wherein the motor and the gear assembly are configured to drive the elongate member such that the front support is retracted towards the rear plunger assembly upon actuation of the motor.

17. The dispensing device according to claim 15, wherein the elongate member is a toothed rack which is driven by a pinion gear of the gear assembly upon actuation of the motor.

18. The dispensing device according to claim 15, wherein the motor and the gear assembly are configured to drive the elongate member such that the rear plunger assembly is driven towards the front support upon actuation of the motor.

19. The dispensing device according to claim 15, wherein the elongate member is an externally threaded rod coupled via the gear assembly to the motor via a lead screw nut movable thereon such that rotation of the motor drives the rear plunger assembly towards and away from the front support.

20. The dispensing device according to claim 19, wherein the lead screw nut comprises a pair of split nuts which are engageable and disengageable from the externally threaded rod via a user actuable lever.

* * * * *